US006433733B2

(12) United States Patent
Syrjärinne et al.

(10) Patent No.: US 6,433,733 B2
(45) Date of Patent: Aug. 13, 2002

(54) METHOD FOR DETERMINING THE POSITION OF AN OBJECT, A POSITIONING SYSTEM, A RECEIVER AND AN ELECTRONIC DEVICE

(75) Inventors: Paula Syrjärinne, Tampere; Ilkka Kontola, Julkujärvi, both of (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/851,239

(22) Filed: May 8, 2001

(30) Foreign Application Priority Data

May 8, 2000 (FI) .............................. 20001069

(51) Int. Cl.[7] ............................................... G01S 5/14
(52) U.S. Cl. ................................................. 342/357.08
(58) Field of Search ..................... 342/357.08, 357.09, 342/357.1

(56) References Cited

U.S. PATENT DOCUMENTS

| | | | |
|---|---|---|---|
| 5,512,902 A | 4/1996 | Guthrie et al. ............... | 342/357 |
| 5,781,150 A | 7/1998 | Norris ........................ | 342/357 |
| 5,878,369 A | 3/1999 | Rudow et al. ............... | 701/215 |
| 5,923,294 A | * 7/1999 | Bacelon et al. ............. | 342/457 |
| 6,081,229 A | * 6/2000 | Soliman et al. ........ | 342/357.01 |
| 6,175,328 B1 | 1/2001 | Ericsson et al. ....... | 342/357.08 |

FOREIGN PATENT DOCUMENTS

WO    WO 97/01104    1/1997

* cited by examiner

Primary Examiner—Thomas H. Tarcza
Assistant Examiner—Fred H. Mull
(74) Attorney, Agent, or Firm—Perman & Green, LLP

(57) ABSTRACT

The invention relates to a method for determining the position of an object to be searched for. The method applies a receiver (RX1) for the object to be searched substantially in the vicinity of the object to be searched, a receiver (RX2) for a searcher, with respect to which the position of the object to be searched is determined, and satellites (SV1–SV4) from which a code-modulated random spectrum signal is transmitted, and positioning data of the satellites are determined. In the method, a default position ($[\hat{x}_s, \hat{y}_s, \hat{z}_s, \hat{t}_s]$) is determined for the receiver (RX2) of the searcher; pseudo ranges ($\rho_{i1}$) to at least three satellites (SV1–SV4) are measured on the basis of signals received from the satellites in the receiver (RX1) of the object to be searched; pseudo ranges ($\rho_{i2}$) to at least said three satellites (SV1–SV4) are measured on the basis of signals received from the satellites in the receiver (RX2) of the searcher; and at least the direction and distance ($[\Delta x, \Delta y, \Delta z, \Delta t]$) of the object to be searched from the receiver (RX2) of the searcher are determined.

23 Claims, 3 Drawing Sheets

METHOD FOR DETERMINING THE POSITION OF AN OBJECT, A POSITIONING SYSTEM, A RECEIVER AND AN ELECTRONIC DEVICE

BACKGROUND OF THE INVENTION

A method for determining the position of an object, a positioning system, a receiver and an electronic device.

The present invention relates to a method for determining the position of an object according to the preamble of the appended claim 1, a positioning system according to the preamble of the appended claim 9, a searcher receiver according to the preamble of the appended claim 17, a searcher receiver according to the preamble of the appended claim 18, an electronic device according to the preamble of the appended claim 19, an electronic device according to the preamble of the appended claim 21, and a computing server according to the preamble of the appended claim 23.

One known positioning system is the GPS system (Global Positioning System) which presently comprises more than 20 satellites, of which 4 or more are simultaneously within the sight of a receiver; for example in Finland, depending on the latitude, even more than 14 satellites can be detected simultaneously, thanks to visibility across the North Pole. These satellites transmit e.g. positioning data of the satellite, as well as data on the time of the satellite. The receiver to be used in positioning normally deduces its position by calculating the transmission time of a signal transmitted simultaneously from several satellites belonging to the positioning system to the receiver. For the positioning, the receiver must typically receive the signal of at least four visible satellites to make it possible to compute the position.

Each satellite of the GPS system transmits a so-called L1 signal at a carrier frequency of 1575.42 MHz. This frequency is also indicated with $154f_0$, where $f_0=10.23$ MHz. Furthermore, the satellites transmit an L2 signal at a carrier frequency of 1227.6 MHz, i.e. $120f_0$. In the satellite, the modulation of these signals is performed with at least one pseudo sequence. This pseudo sequence is different for each satellite. As a result of the modulation, a code-modulated wideband signal is generated. The modulation technique used makes it possible in the receiver to separate the signals transmitted from different satellites, although the carrier frequencies used in the transmission are substantially the same. This modulation technique is called code division multiple access (CDMA). In each satellite, for modulating the L1 signal, the pseudo sequence used is e.g. a so-called C/A code (Coarse/Acquisition code), which is a Gold code. Each GPS satellite transmits a signal by using an individual C/A code. The codes are formed as a modulo-2sum of two 1023-bit binary sequences. The first binary sequence G1 is formed with a polynome $X^{10}+X^3+1$, and the second binary sequence G2 is formed by delaying the polynome $X^{10}+X^9+X^8+X^6+X^3+X^2+1$ in such a way that the delay is different for each satellite. This arrangement makes it possible to produce different C/A codes with an identical code generator. The C/A codes are thus binary codes whose chipping rate in the GPS system is 1.023 MHz. The C/A code comprises 1023 chips, wherein the iteration time of the code (epoch) is 1 ms. The carrier of the L1 signal is further modulated with navigation information at a bit rate of 50 bit/s. The navigation information comprises information about the health of the satellite, its orbit, time data, etc.

During their operation, the satellites monitor the condition of their equipment. The satellites may use for example so-called watch-dog operations to detect and report possible faults in the equipment. The errors and malfunctions can be instantaneous or longer lasting. On the basis of the health data, some of the faults can possibly be compensated for, or the information transmitted by a malfunctioning satellite can be totally disregarded. Furthermore, in a situation in which the signal of more than four satellites can be received, different satellites can be weighted differently on the basis of the health data. Thus, it is possible to minimize the effect of errors on measurements, possibly caused by satellites which seem unreliable.

To detect the signals of the satellites and to identify the satellites, the receiver must perform synchronization, whereby the receiver searches for the signal of each satellite at the time and attempts to be synchronized and locked to this signal so that the data transmitted with the signal can be received and demodulated.

The positioning receiver must perform the synchronization e.g. when the receiver is turned on and also in a situation in which the receiver has not been capable of receiving the signal of any satellite for a long time. Such a situation can easily occur e.g. in portable devices, because the device is moving and the antenna of the device is not always in an optimal position in relation to the satellites, which impairs the strength of the signal coming to the receiver. Also, in urban areas, buildings affect the signal to be received, and furthermore, so-called multipath propagation can occur, wherein the transmitted signal comes to the receiver along different paths, e.g. directly from the satellite (line-of-sight) and also reflected from buildings. This multipath propagation causes that the same signal is received as several signals with different phases.

The positioning arrangement has two primary functions:
1. to calculate the pseudo range between the receiver and the different GPS satellites, and
2. to determine the position of the receiver by utilizing the calculated pseudo ranges and the position data of the satellites.

The position data of the satellites at each time can be calculated on the basis of the Ephemeris and time correction data received from the satellites.

The distances to the satellites are called pseudo ranges, because the time is not accurately known in the receiver. The pseudo range can be computed by measuring the pseudo range lags between the signals from different satellites. Because time is not known with absolute precision, the position and the time must be found out preferably by iteration of the measured data with a linearized set of equations. Thus, the determinations of the position and of the time are iterated until a sufficient precision has been found with respect to the time and position.

After the receiver has been synchronized with the received signal, the information transmitted in the signal is demodulated to find out e.g. the Ephemeris and time data transmitted from the satellites.

Positioning systems and positioning receivers of prior art are intended for finding out the position of one object only, i.e. the positioning receiver. However, in practice, situations may occur in which it should be possible to determine the direction and distance between one positioning point and an object. For example, when a mother loses eye contact to her child, the mother should be able to find out in which direction and how far the child has gone. In general, when a searcher is searching for an object, it is primarily these direction and distance data and not the absolute coordinates that are significant for the searcher. If such a problem could be solved by using equipment of prior art, a positioning receiver on the object to be found should transmit positioning data to the positioning receiver of the searcher. Thus, the positioning receiver of the searcher could compute the direction vector on the basis of the positioning data of the object and on the searcher. In practice, the accuracy of such a determination is not always the best possible. In both positionings, errors may occur which in the worst case are accumulated upon calculating the direction vector between the positions. Furthermore, this method has the drawback that two different receivers may use signals transmitted from different satellites for their positioning, wherein the significance of non-compatible interference may increase.

The most significant sources of error affecting the calculation of the pseudo ranges include the atmosphere, intentional inaccuracy, multipath propagation, and the receiver. Some of the atmospheric effects are dependent on the frequency to at least some extent. However, atmospheric effects cannot be significantly compensated for in receivers intended for civil use, because for civil use there is only one carrier frequency (L1) available to be received in the positioning receiver. The organization maintaining the GPS satellite positioning system (U.S. Department of Defence) intentionally provides selective availability (SA) of the signals of the satellites, which impairs the accuracy of the positioning. This inaccuracy is induced either by changing the positioning data transmitted by the satellites or by inducing inaccuracy in the clock of the satellite. As a result of multipath propagation, the receiver may be erroneously synchronized with a multipath propagated signal instead of a directly propagated signal. The path propagated by such a signal is longer than that of a directly propagated signal, wherein the positioning is distorted to some extent. Furthermore, errors can be caused by unideal properties of the positioning receiver. For example, errors can be caused by a deviation of the reference clock of the receiver from the GPS time. The measurement results are also distorted by asymmetries on the different receiving channels of the positioning receiver.

Said primary sources of error can further be divided into commonmode errors and non-common-mode errors. Errors caused by atmospheric effects and said selective availability are common-mode errors. These errors can be assumed to be substantially the same in the vicinity of the receiver. Thus, common-mode errors have substantially the same effect on all the positioning receivers in the same area, provided that they receive the signals of the same satellites. Multipath propagation and unideal properties of the receiver are non-common-mode sources of error, wherein these sources of error can also cause different errors in positioning devices in the same area.

SUMMARY OF THE INVENTION

It is an aim of the present invention to provide a method for positioning another GPS receiver to be found in an electronic device performing the searching and comprising at least a positioning receiver. The invention is based on the idea that the searching device finds the direction and distance of the object to be searched with respect to the searcher by utilizing the fact that the common-mode errors can be eliminated. Thus, to start the computing, the position of the searcher is used as the initial position of the object to be found. More precisely, the method according to the present invention is characterized in what will be presented in the characterizing part of the appended claim 1. The positioning system according to the present invention is characterized in what will be presented in the characterizing part of the appended claim 9. The receiver according to an advantageous embodiment of the present invention is characterized in what will be presented in the characterizing part of the appended claim 17. The receiver according to another advantageous embodiment of the present invention is characterized in what will be presented in the characterizing part of the appended claim 18. The electronic device according to an advantageous embodiment of the present invention is characterized in what will be presented in the characterizing part of the appended claim 19. The electronic device according to another advantageous embodiment of the present invention is characterized in what will be presented in the characterizing part of the appended claim 21. The computing server according to the present invention is characterized in what will be presented in the characterizing part of the appended claim 23.

Considerable advantages are achieved with the present invention when compared with methods and receivers of prior art. Using the method of the invention, the direction and distance of an object to be searched from the searcher can be determined in a significantly more accurate way than is possible to achieve with methods and systems of prior art.

BRIEF DESCRIPTION OF THE DRAWINGS

The present invention will be described in more detail with reference to the appended drawings, in which.

DETAILED DESCRIPTION OF THE INVENTION

Figure 1:
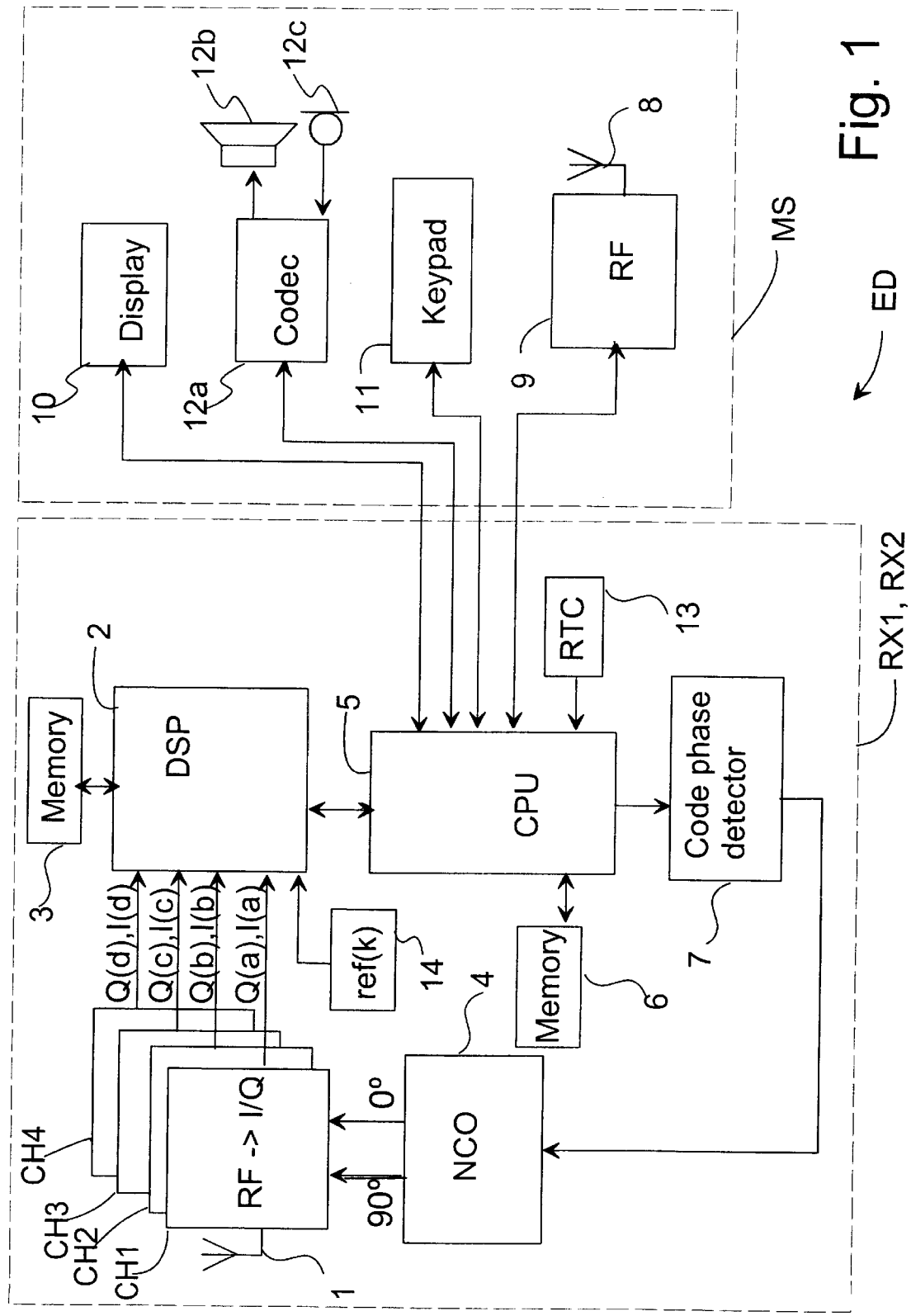
FIG. 1 shows, in a reduced block chart, a receiver to be searched and in which the method of the invention can be applied.

FIG. 1 shows a positioning receiver RX1, RX2 of an electronic device ED according to a preferred embodiment of the invention, in which a signal to be received via a first antenna 1 is converted preferably to an intermediate frequency or directly to a carrier frequency on receiving channels CH1–CH4. The receiver RX1, RX2 of FIG. 1 comprises four receiving channels CH1–CH4, but it is obvious that the number of channels can be different from that presented here. The signal converted to the intermediate frequency or carrier frequency in the receiving channels CH1–CH4 comprises two components, known as such: I and Q components, with a phase difference of approximately 90° therebetween. These analog signal components, converted to the intermediate frequency, are digitized. During the digitizing of the signal components, preferably at least one sample is taken of each chip, i.e. in the GPS system, at least 1,023,000 samples are thus taken in a second. Furthermore, the I and Q components of the digitized signal are multiplied by a signal formed with a first numerically controlled oscillator 4 (NCO). This signal of the first numerically controlled oscillator 4 is intended to correct a frequency deviation due to the Doppler shift and the frequency error of the local oscillator 13 of the receiver 1. The signals formed in the receiving channels CH1–CH4 and indicated with the references Q(a),I(a)–Q(d),I(d) in FIG. 1, are preferably led to a digital signal processor 2. In block 14, also reference codes ref(k) are generated, corresponding to the codes used in code modulation of the satellites to be received. Using e.g.

this reference code ref(k), the receiver RX1, RX2 attempts to find the code phase and frequency deviation of the signal of the satellite to be received on each receiving channel, to be used in operations after the synchronization.

A control block 5 is used to control e.g. a code phase detector 7 which is used to adjust the frequency of the numerically controlled oscillator 4, if necessary. The synchronization will not be described in more detail in this specification, but it is prior art known per se. After the receiving channel has been synchronized with the signal of a satellite SV1, SV2, SV3, SV4, it is possible to start demodulation and storage of the navigation information transmitted in the signal. The digital signal processor 2 stores navigation information preferably in first memory means 3.

Furthermore, the control block 5 preferably controls e.g. positioning computing, data reading and presenting, performing of mobile station functions, etc. In this preferred embodiment, second memory means 6 are used as the data memory and program memory of the control block 5. It is obvious that the first memory means 3 and the second memory means 6 can also comprise common memory. Furthermore, the positioning receiver RX1, RX2 comprises means MS for performing the functions of the wireless device, such as a second antenna 8, a radio part 9, audio means, such as a codec 12a, a speaker 12b and a microphone 12c, a display 10, and a keypad 11.

Figure 2:
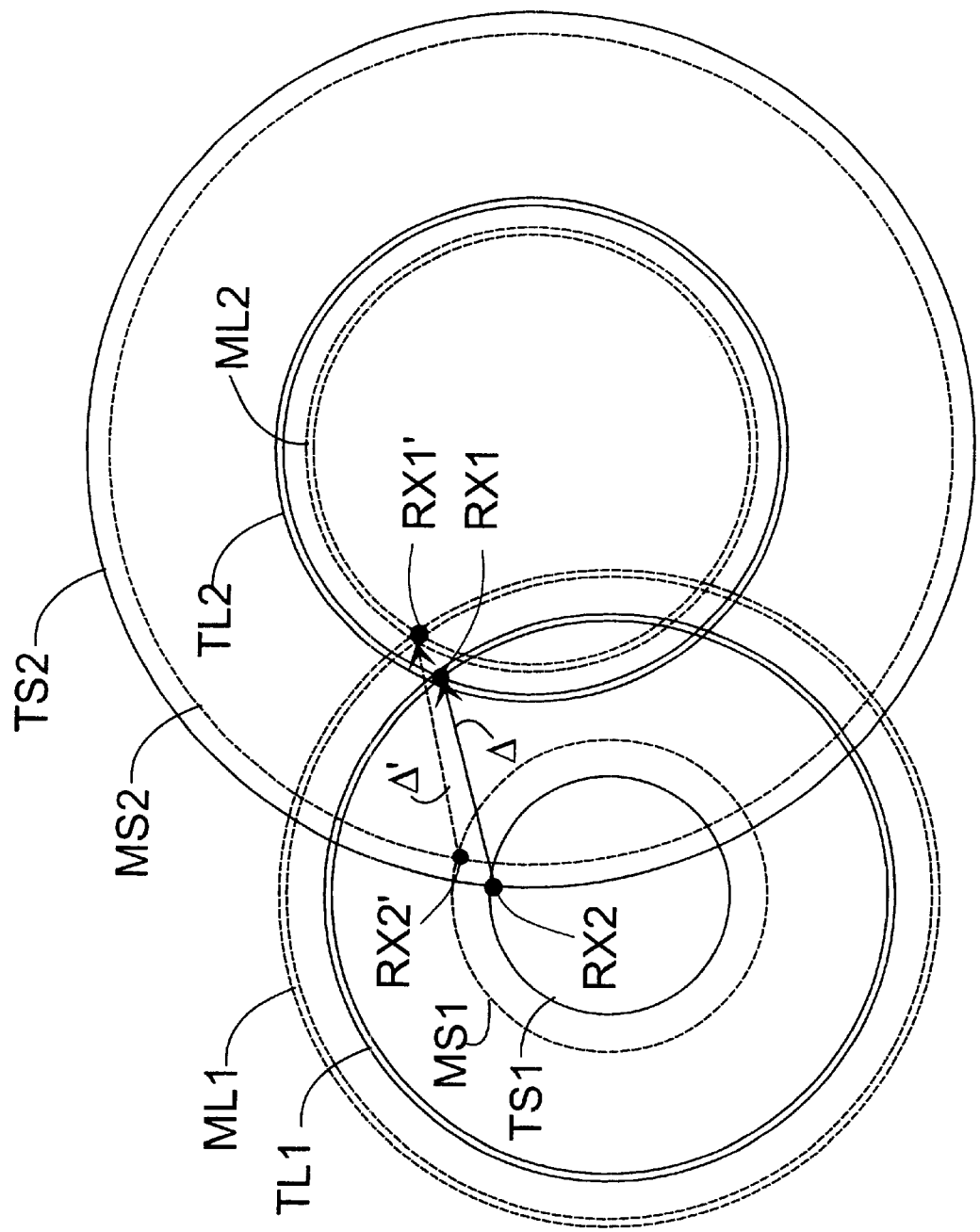
FIG. 2 shows, in a principle view, the effect of various sources of error on the determination of the position to be searched by a preferred embodiment of the method of the invention.
Figure 3:
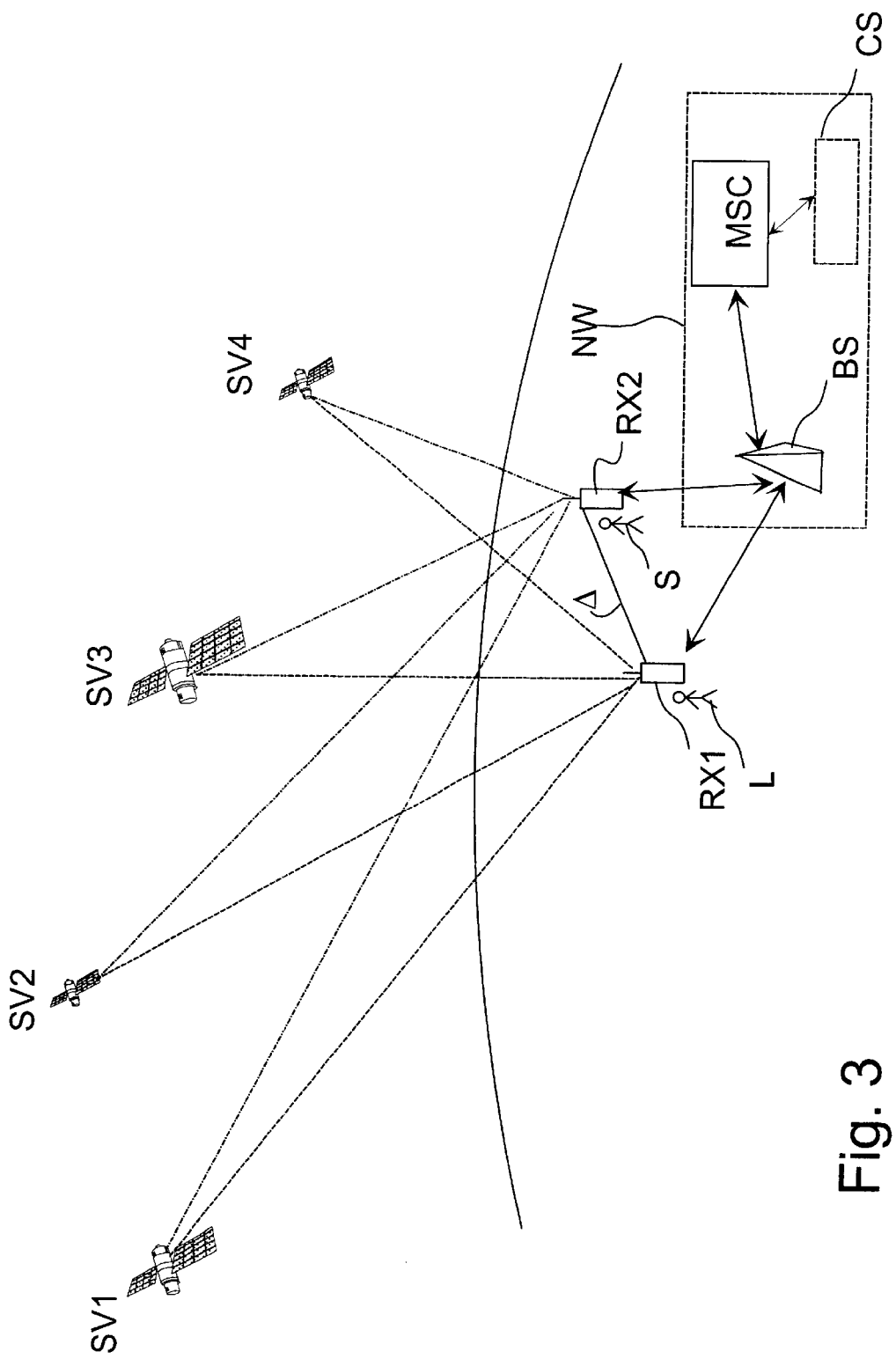
FIG. 3 shows, in a reduced principle view, the positioning system according to a preferred embodiment of the invention.

In the following, the invention will be described in a positioning system according to an advantageous embodiment of the invention, as shown in FIG. 2, where a searcher S attempts to find out the position of an object L to be searched. The object L has a receiver RX1 and the searcher S has a receiver RX2. These receivers RX1, RX2 are preferably receivers according to FIG. 1. The example receivers RX1, RX2 used herein are GPS receivers, but it is obvious that the invention can also be applied in other types of satellite positioning systems. Furthermore, the receiver RX1 at the object L to be searched is not necessarily similar to the receiver RX2 by the searcher S. Below in this description, it will be presented which properties these receivers RX1, RX2 should have to apply the method of the invention. Furthermore, it is assumed herein that the position of the receiver RX2 of the searcher is known at some accuracy. This position of the receiver RX2 of the searcher can be determined for example so that the position is calculated in the receiver RX2 of the searcher by using as the default value the position of the base transceiver station BTS of the mobile communication network NW forming the cell in whose area the receiver RX2 of the searcher is at the moment of searching. On the other hand, the position of the receiver RX2 of the searcher can also be determined, in a way known as such, solely on the basis of the signals received in the receiver RX2. Of the mobile communication network NW, only one base transceiver station BTS and a mobile switching centre MSC are shown as examples in FIG. 2, but it is known as such that the mobile communication network typically comprises several base transceiver stations as well as other functional elements. The mobile communication network NW can be for example a GSM mobile communication network or a UMTS mobile communication network.

Both receivers RX1, RX2 receive signals transmitted from the same, preferably at least three satellites SV1–SV4. To receive the signals to be received from the different satellites substantially simultaneously, each receiver must have at least three, preferably at least four receiving channels CH1–CH4. On these receiving channels, the signals to be received from the different satellites are converted preferably to an intermediate frequency and sampled to form a digital sample signal. On the basis of these sample signals, code acquisition and tracking are performed in the receiver by a method known as such.

In the method according to a first advantageous embodiment of the invention, the receivers RX1, RX2 measure pseudo ranges $\rho_{i1}$, $\rho_{i2}$ to the satellites from which signals have been received. After the pseudo ranges $\rho_{i1}$ have been measured in the receiver RX1 of the object to be searched, the receiver RX1 of the object to be searched transmits these pseudo ranges $\rho_{i1}$ to the receiver RX2 of the searcher, for example via the mobile communication network NW. Furthermore, the geometrical distances $r_i$ to these satellites are calculated in the receiver RX2 of the searcher. In computing the geometrical distances $r_i$, one counting point used is the position known in the receiver RX2 of the searcher, and other counting points are the positions of the satellites computed on the basis of the positioning data of the satellites. The positioning data can be obtained either from the modulation signal transmitted in the signals received from the satellites, or e.g. from the base transceiver station BTS of the mobile communication network, if these positioning data are available in the mobile communication network. As a difference between the geometrical distances and the pseudo ranges, correction terms are obtained for the pseudo ranges. Even though these correction terms can be relatively rough and they can be even incorrect, if the position data of the searcher is incorrect, it can still be expected that the correction terms are usable in the vicinity of the searcher. Consequently, possible errors in the correction terms are the same at a sufficient accuracy, also with regard to the position of the object to be searched. In the receiver RX2 of the searcher, the error of the pseudo ranges with respect to the geometrical distances can be calculated with the formula $$\epsilon_i r_i - \rho_{i2} \tag{1}$$

At this stage, the receiver RX2 of the searcher knows e.g. the position of the receiver RX2 of the searcher at some accuracy; the corrected pseudo ranges between the receiver RX2 of the searcher and the satellites from which signals have been received in the receiver RX2 of the searcher for measuring the pseudo ranges; the corrected pseudo ranges between the receiver RX1 to be searched and the satellites from which signals have been received in the receiver RX1 to be searched for measuring the pseudo ranges; as well as the positions of the satellites which have been used in the measurement of the pseudo ranges both in the receiver RX2 of the searcher and the receiver RX1 to be searched. After this, these calculated errors Ed in the pseudo ranges are used in the receiver RX2 of the searcher for correcting the pseudo ranges $\rho_{i2}$ of the receiver to be searched. Thus, it is assumed here that the errors in the pseudo ranges in the receiver RX1 of the object to be searched are substantially the same as the errors $\epsilon_i$ in the pseudo ranges calculated in the receiver of the searcher. After the corrected pseudo ranges $\hat{\rho}_{i1}$, $\hat{\rho}_{i2}$ have been determined, it is possible to calculate the coordinates of the receiver RX1 to be searched by means of the corrected pseudo ranges $\hat{\rho}_{i2}$ of the receiver RX2 of the searcher and the corrected pseudo ranges $\hat{\rho}_{i1}$ of the receiver RX1 to be searched. It is then possible to calculate the direction of the receiver RX1 to be searched from the receiver RX2 of the searcher, and the distance between the receivers RX1, RX2.

Although, in the method presented above, it was assumed that the position of the receiver RX2 of the searcher is known at some accuracy, it is not of great significance to the final direction and distance data of the object to be searched even if the position data were not fully correct. This is due e.g. to the fact that in the method, the differences between the positions of two receivers are calculated by using at both points pseudo ranges determined from the same satellites and by correcting the determined pseudo ranges by means of errors calculated at only one point. However, it is not necessary in this method to determine the absolute position of the points.

We shall next describe an algorithm to be used in a method according to another advantageous embodiment of the invention for determining the relative position of the receiver to be searched. In this description, the algorithm used in this embodiment is called squared equations. The aim of this algorithm is to produce a difference in coordinates of the object to be searched and the searcher. The coordinate system used is an earth centered, earth fixed coordinate system ECEF. Unideal properties of the clocks in the receivers RX1, RX2 are disregarded in this embodiment. This will thus require that the moments of measuring the pseudo ranges in the receiver RX2 of the searcher and in the receiver RX1 to be searched must be synchronized as accurately as possible to be simultaneous. When the receivers are well synchronized, it is possible to eliminate at least some of the common-mode errors and to determine the direction and distance between the receivers. This method has e.g. the advantage that no iteration will be needed to arrive at a solution, wherein it does not require great computing capacity.

The receiver RX1 to be searched transmits data on the pseudo ranges measured by itself to the receiver RX2 of the searcher for example via a mobile communication network. The receiver RX2 of the searcher selects from these pseudo ranges those measured to the satellites to which also the receiver RX2 of the searcher is or has been measuring the pseudo ranges.

Let us indicate the position of the receiver RX1 to be searched with $\lfloor x_L, y_L, z_L \rfloor$, the position of the receiver RX2 of the searcher correspondingly with $\lfloor x_S, y_S, z_S \rfloor$, and the direction and distance between the receivers with a direction vector $\lfloor \Delta x, \Delta y, \Delta z \rfloor$. Let us indicate the position of the satellites at the moment after transmission of the signal to be used in the calculation of the pseudo ranges with $\lfloor x_i, y_i, z_i \rfloor$, in which i=satellite index, and since at least three satellites have been used, i receives at least the values from one to three. The pseudo ranges $\rho_{i1}, \rho_{i2}$ can be calculated by the formulas $$\rho_{1S} = \sqrt{(x_1-x_S)^2+(y_1-y_S)^2+(z_1-z_S)^2}$$
$$\rho_{2S} = \sqrt{(x_2-x_S)^2+(y_2-y_S)^2+(z_2-z_S)^2}$$
$$\rho_{3S} = \sqrt{(x_3-x_S)^2+(y_3-y_S)^2+(z_3-z_S)^2} \quad (2a)$$
$$\rho_{1L} = \sqrt{(x_1-x_L)^2+(y_1-y_L)^2+(z_1-z_L)^2}$$
$$\rho_{2L} = \sqrt{(x_2-x_L)^2+(y_2-y_L)^2+(z_2-z_L)^2}$$
$$\rho_{3L} = \sqrt{(x_3-x_L)^2+(y_3-y_L)^2+(z_3-z_L)^2} \quad (2b)$$

In this example, only three equations (three different satellites) are used for clarity, but it is obvious that within the scope of the present invention, it is also possible to use more corresponding equations to calculate the pseudo ranges to more than three satellites.

In the next step, these equations (2a), (2b) are squared. In this case, the squaring will not cause a loss of information, because the pseudo range terms are known to be positive.

$$\rho^2_{1S}=(x_1-x_S)^2+(y_1-y_S)^2+(z_1-z_S)^2$$
$$\rho^2_{2S}=(x_2-x_S)^2+(y_2-y_S)^2+(z_2-z_S)^2$$
$$\rho^2_{3S}=(x_3-x_S)^2+(y_3-y_S)^2+(z_3-z_S)^2 \quad (3a)$$
$$\rho^2_{1L}=(x_1-x_L)^2+(y_1-y_L)^2+(z_1-z_L)^2$$
$$\rho^2_{2L}=(x_2-x_L)^2+(y_2-y_L)^2+(z_2-z_L)^2$$
$$\rho^2_{3L}=(x_3-x_L)^2+(y_3-y_L)^2+(z_3-z_L)^2 \quad (3a)$$

The squaring is followed by subtraction of the equations of formula (3a) from the equations of the formula (3b) related to the same satellites; i.e. in the above example, the first equation of the formula (3a) is subtracted from the first equation of the formula (3b), the second equation of the formula (3a) is subtracted from the second equation of the formula (3b), and the third equation of the formula (3a) is subtracted from the third equation of the formula (3b). Thus, the following equations are obtained:

$$\rho^2_{1L}-\rho^2_{1S}=-2x_1\Delta x+x_L^2-x_S^2-2y_1\Delta y+y_L^2-y_S^2-2z_1\Delta z+z_L^2-z_S^2$$
$$\rho^2_{2L}-\rho^2_{2S}=-2x_2\Delta x+x_L^2-x_S^2-2y_2\Delta y+y_L^2-y_S^2-2z_2\Delta z+z_L^2-z_S^2$$
$$\rho^2_{3L}-\rho^2_{3S}=-2x_3\Delta x+x_L^2-x_S^2-2y_3\Delta y+y_L^2-y_S^2-2z_3\Delta z+z_L^2-z_S^2 \quad (4)$$

in which the direction vector $\lfloor \Delta x, \Delta y, \Delta z \rfloor$ thus indicates the difference in the ECEF coordinates of the receiver to be searched and the receiver of the searcher $\lfloor x_L-x_S, y_L-y_S, z_L-z_S \rfloor$. The next step is to eliminate unknown terms, such as $x_L^2$, $x_S^2$, from the formula (4). This can be performed preferably by subtracting from the first line of the formula (4) the second line, from the second line the third line, and from the third line the first line. By indicating $\rho_{iL}^2-\rho_{iS}^2=\Delta\rho_i$, the new set of equations formed on the basis of the subtractions can be presented as follows:

$$\Delta\rho_1-\Delta\rho_2=-2(x_1-x_2)\Delta x-2(y_1-y_2)\Delta y-2(z_1-z_2)\Delta z$$
$$\Delta\rho_2-\Delta\rho_3=-2(x_2-x_3)\Delta x-2(y_2-y_3)\Delta y-2(z_2-z_3)\Delta z$$
$$\Delta\rho_3-\Delta\rho_1=-2(x_3-x_1)\Delta x-2(y_3-y_1)\Delta y-2(z_3-z_1)\Delta z \quad (5)$$

This is thus a linear set of equations in which the number of unknown variables $\Delta x, \Delta y, \Delta z$ is equal to the number of equations, wherein the set of equations can be solved and the direction vector can be found out. Thus, in this method, it is not necessary to find out the coordinates of the receiver RX1 to be searched, errors in the measured pseudo ranges, and even the coordinates of the receiver RX2 of the searcher do not need to be accurately known. The requirement is, however, that the searcher and the object to be searched are relatively close to each other, preferably within a radius of less than 20 km. Furthermore, if the measured pseudo ranges are not corrected, it is thus not necessary to measure the geometrical distances either.

If sets of more than three equations are used, the method to be applied in solving them is essentially the same as that presented above, Thus, the final, overdetermined set of equations corresponding to the formula (5) is solved by using preferably the least squares method.

In the following, we shall describe an algorithm for determining the relative position of the receiver to be searched, to be used in a method according to a third advantageous embodiment of the invention. This algorithm is based on Taylor's method of linearization. Also in this embodiment, the position of the searcher is assumed to be known at some accuracy, and the coordinates of the position of the object to be searched are not calculated but a direction vector $\lfloor \Delta x, \Delta y, \Delta z \rfloor$ from the searcher to the object to be searched. This direction vector corresponds to the residual vector known from Taylor's calculation formulas. In this embodiment, the calculation of the direction vector can be iterated, if necessary, to achieve better accuracy.

Also in this embodiment, the receiver RX1 to be searched transmits data on the pseudo ranges measured by itself to the receiver RX2 of the searcher e.g. via a mobile communication network. In the receiver RX2 of the searcher, it is possible to use all the received pseudo ranges or to select from these pseudo ranges those measured to the satellites to which also the receiver RX2 of the searcher is or has been measuring the pseudo ranges.

The position of the searcher and the object to be searched in the ECEF coordinate system can be expressed with the following formulas which, excluding the time term, correspond to the formulas (2a) and (2b).

$$\rho_i = \sqrt{(x_{i-x_L})^2 + (y_{i-y_L})^2 + (z_{i-z_L})^2} + ct_L = f(x_L, y_L, z_L, t_L), i=1,\ldots,n \quad (6)$$

where c is the speed of light, n is the number of signals of satellites used in the search and received in both receivers.

Let us indicate the estimated position of the receiver RX1 to be searched with a vector $\lfloor \hat{x}_L, \hat{y}_L, \hat{z}_L, \hat{t}_L \rfloor$. The real position of the receiver RX1 to be searched can thus be expressed with the formula $$\lfloor x_L, y_L, z_L, t_L \rfloor = \lfloor \hat{x}_L, \hat{y}_L, \hat{z}_L, \hat{t}_L \rfloor + \lfloor \Delta x, \Delta y, \Delta z, \Delta t \rfloor \quad (7)$$

in which $\lfloor \Delta z, \Delta y, \Delta z, \Delta t \rfloor$ is the error in the estimated position. The linear approximations of the pseudo range formulas in the estimated position can be determined by selecting the linear terms of Taylor series at point $\lfloor \hat{x}_L, \hat{y}_L, \hat{z}_L, \hat{t}_L \rfloor$. According to Taylor's theorem on multi-variable functions, the linear equations can be written as follows:

$$f(\hat{x}_L + \Delta x, \hat{y}_L + \Delta y, \hat{z}_L + \Delta z, \hat{t}_L + \Delta t) = \quad (8)$$
$$f(\hat{x}_L, \hat{y}_L, \hat{z}_L, \hat{t}_L) + \frac{\partial f(\hat{x}_L, \hat{y}_L, \hat{z}_L, \hat{t}_L)}{\partial x} \Delta x + \frac{\partial f(\hat{x}_L, \hat{y}_L, \hat{z}_L, \hat{t}_L)}{\partial y} \Delta y +$$
$$\frac{\partial f(\hat{x}_L, \hat{y}_L, \hat{z}_L, \hat{t}_L)}{\partial z} \Delta z + \frac{\partial f(\hat{x}_L, \hat{y}_L, \hat{z}_L, \hat{t}_L)}{\partial t} \Delta t$$

Thus, the error in the estimated position $\lfloor \Delta x, \Delta y, \Delta z, \Delta t \rfloor$ can be calculated by using in this case at least four linearized pseudo range equations. Since it has been assumed herein that the searcher and the object to be searched are relatively close to each other, the position of the searcher $\lfloor \hat{x}_S, \hat{y}_S, \hat{z}_S, \hat{t}_S \rfloor$ can be taken as a starting point for determining the position $\lfloor \hat{x}_L, \hat{y}_L, \hat{z}_L, \hat{t}_L \rfloor$ of the object to be searched, further assuming that the receiver RX2 of the searcher has no clock error, i.e. $\hat{t}_L = 0$. In this method according to another advantageous embodiment of the invention, the above-presented formula (8) is solved to obtain an error $\lfloor \Delta x, \Delta y, \Delta z, \Delta t \rfloor$ in the estimated position, which is simultaneously the difference between the positions of the searcher and of the object to be searched, i.e. the direction vector.

The solution can be deduced a follows. By substituting the position of the search on the above formula (8) and by equations is obtained:

$$\rho_{iL} = \rho_{iS} - \frac{x_i - x_S}{\rho_{iS}} \Delta x - \frac{y_i - y_S}{\rho_{iS}} \Delta y - \frac{z_i - z_S}{\rho_{iS}} \Delta z + c\Delta t, \quad (9)$$
$$i = 1, \ldots, n$$

From this set of equations (9), it is possible to solve the unknown direction vector $\lfloor \Delta x, \Delta y, \Delta z, \Delta t \rfloor$.

Next, the direction vector can be converted to a searcher-centered xyz coordinate system, in which x-axis points to the East and y-axis to the North, and z-axis points upwards. Such a coordinate system can also be called East North Up (ENU). The distance, direction and height difference of the receiver RX1 to be searched can thus be calculated relative to the receiver RX2 of the searcher.

Even though time was one variable in the formulas presented above, the corresponding calculations can also be made without the time data. All the time terms are thus excluded from the formulas presented above.

The above-presented calculations can also be iterated, wherein at each iteration time, the results of the previous calculation time are used e.g. as the new estimated position. By increasing the number of iterations, the calculation precision can further be improved. The number of iterations can, however, be kept relatively small, because in the present invention, the starting estimate used for the position to be searched is existing data on the position of the searcher and not a random position as is used in many positioning systems of prior art. The display 10 can be used e.g. to display the direction and distance information to the searcher S.

The invention can also be applied by combining different methods mentioned above e.g. by determining the corrected pseudo ranges by the method according to the first advantageous embodiment of the invention and by then determining the direction vector by the method according to either the second or the third advantageous embodiment of the invention. Thus, the corrected pseudo ranges can be used. Yet another alternative is to determine the position of the searcher, the position of the object to be searched, and then the direction vector on the basis of these position data. This alternative is suitable for use e.g. when the receivers do not, for any reason, receive the signals transmitted by the same satellites.

FIG. 2 shows yet, in a principle view, the effect of various sources of error on the determination of the position of the object to be searched by a method according to an advantageous embodiment of the invention. For clarity, FIG. 2 only shows determinations made according to two satellites. The figure shows the circumference of a circle indicated with a uniform, single line TS1, on which the receiver RX2 of the searcher is really located when viewed from the first satellite SV1 used in the review; that is, the distance between the satellite and the circumference of the circle is the same as the true distance between the searcher and the first satellite. In a corresponding manner, a uniform, single line TS2 indicates the circumference of a circle on which the receiver RX2 of the searcher is really located when viewed from the second satellite SV2 used in the review. A single broken line MS1 indicates the circumference of a circle on which the receiver RX1 of the object to be searched is located on the basis of the measurements, viewed from the first satellite SV1 used in the review; that is, the pseudo range between the searcher and the satellite SV2. A single broken line MS2 indicates the circumference of a circle on which the receiver RX2 of the searcher is located on the basis of the measurements, viewed from the second satellite SV2 used in the review.

A uniform, double line TL1 indicates the circumference of a circle on which the receiver RX1 of the object to be searched is really located when viewed from the first satellite SV1 used in the review; and a uniform, double line TL2 indicates the circumference of a circle on which the receiver RX2 of the object to be searched is really located when viewed from the second satellite SV2 used in the review. Yet a double broken line ML1 indicates the position of the receiver RX1 of the object to be searched, determined on the basis of the measurements and viewed from the first satellite SV1 used in the review; and a double broken line ML2 indicates the position of the receiver RX1 of the object to be searched, determined on the basis of the measurements and viewed from the second satellite SV2 used in the review.

FIG. 2 also indicates the real positions of the receiver RX2 of the searcher and the receiver RX1 to be searched. Furthermore, reference RX1' indicates the position of the receiver to be searched, determined by the method according to an advantageous embodiment of the method, and correspondingly, reference RX1' indicates the estimated position of the receiver of the searcher. From the figure, it can be seen, for example, that the direction and length of the direction vector Δ' determined by the method of the invention does not significantly differ from the direction and length of the direction vector Δ according to the real positions, even though the positions do not necessarily fully comply with the real situation. When using such a system, it is not so necessary for the user to know the coordinates corresponding to his/her own real position or the real position of the object to be searched, but it is more important to know at least the direction and preferably also the distance to the object to be searched.

Most of the blocks required for implementing the method according to the first advantageous embodiment of the invention can be implemented e.g. in a digital signal processor (not shown). Furthermore, for controlling the operation of the receiver, it is possible to use a control means, preferably a microprocessor or the like.

Although it was presented above that the searcher and the object to be searched use a receiver which comprises positioning means, it is obvious that this receiver RX1, RX2 can also be part of an electronic device with also other functions, such as means for performing functions of a mobile station. Furthermore, part of the receiver may comprise common means with the other functions of such an electronic device, which is known as such.

In the above-described methods according to an advantageous embodiment of the invention, the positioning of the receiver RX1 to be searched was performed in connection with the receiver RX2 of the searcher. However, the invention can also be applied in such a way that at least part of the operations described above, such as the calculation of the direction vector, can also be implemented e.g. in a computing server CS or the like. Thus, the receiver RX1 to be searched and the receiver RX2 of the searcher transmit the pseudo range data measured by them to this computing server via a communication network, such as a mobile communication network NW. After the computing server has determined the direction vector, the computing server sends the data on this direction vector to the receiver RX2 of the searcher, in which e.g. a display device is used to display data on the distance and direction of the object to be searched in relation to the searcher.

Furthermore, the invention can be applied in connection with other such positioning systems, in which distances are measured to measuring points whose positions are known.

The present invention is not limited solely to the embodiments presented above, but can be modified within the scope of the appended claims.

What is claimed is:

1. A method for determining the position of an object to be searched, which method applies a receiver (RX1) for an object to be searched, substantially in the vicinity of the object to be searched, a receiver (RX2) for a searcher, with respect to which the position of the object to be searched is determined, and satellites (SV1–SV4) from which a code-modulated random spectrum signal is transmitted; and determining positioning data of the satellites, characterized in that in the method, at least the following steps are performed:

determining a default position ($[\hat{x}_S,\hat{y}_S,\hat{z}_S,\hat{t}_S]$) for the receiver (RX2) of the searcher, measuring pseudo ranges ($\rho_{i1}$) to at least three satellites (SV1–SV4) on the basis of signals received from the satellites, in the receiver (RX1) of the object to be searched, measuring pseudo ranges ($\rho_{i2}$) to at least said three satellites (SV1–SV4) on the basis of signals received from the satellites, in the receiver (RX2) of the searcher, and determining at least the direction and distance ($[\Delta x,\Delta y,\Delta z,\Delta t]$) of the object to be searched from the receiver (RX2) of the searcher, wherein said determining step employs the pseudo ranges measured by the object receiver and the pseudo ranges measured by the searcher receiver based on an assumption that there is a common error in measurements performed by the object receiver and by the searcher receiver.

2. The method according to claim 1, characterized in that the direction and distance ($[\Delta x,\Delta y,\Delta z,\Delta t]$) of the object to be search determined in the receiver (RX2) of the searcher, wherein information on the measured pseudo ranges is transmitted from the receiver (RX1) of the object to be searched to the receiver (RX2) of the searcher.

3. The method according to claim 1, characterized in that the method applies a communication network, wherein a data transmission link is formed from the receiver (RX1) to be searched and from the receiver (RX2) of the searcher to said communication network, at least for the transmission of said information on pseudo ranges.

4. The method according to claim 1, characterized in that the method also comprises at least the following steps:

determining the geometrical distance ($r_i$) from the receiver (RX2) of the searcher to said at least three satellites (SV1–SV4) on the basis of the positioning data and said default position, correcting the pseudo ranges ($\epsilon_i$) measured in the receiver (RX1) of the object to be searched and in the receiver (RX2) of the searcher on the basis of the determined geometrical distance, and using the corrected pseudo ranges for determining the direction and distance ($[\Delta x,\Delta y,\Delta z,\Delta t]$) of the object to be searched from the receiver (RX2) of the searcher.

5. The method according to claim 1, characterized in that the direction and distance ($[\Delta x,\Delta y,\Delta z,\Delta t]$) of the object to be searched are determined by determining the position of the receiver of the object to be searched and by calculating the difference between the default position of the receiver (RX2) of the searcher and the position of the receiver (RX1) of the object to be searched.

6. The method according to claim 1, characterized in that the direction and distance ($[\Delta x,\Delta y,\Delta z,\Delta t]$) of the object to be searched are determined by Taylor's method of linearization.

7. The method according to claim 6, characterized in that the direction and distance ($\lfloor\Delta x,\Delta y,\Delta z,\Delta t\rfloor$) of the object to be searched are determined by solving the set of equations:

$$\rho_{iL} = \rho_{iS} - \frac{x_i - x_S}{\rho_{iS}}\Delta x - \frac{y_i - y_S}{\rho_{iS}}\Delta y - \frac{z_i - z_S}{\rho_{iS}}\Delta z + c\Delta t, \; i = 1, \ldots, n$$

in which
- n=the number of satellites (SV1–SV4) used for positioning,
- c=the speed of light $\lfloor x_S, x_S, z_S\rfloor$=the position of the receiver (RX2) of the searcher,
- $\lfloor x_i, y_i, z_i\rfloor$=the position of satellites at moment of transmission of the signal used in the calculation of the pseudo ranges, and
- $\Delta t$=the clock error.

8. The method according to claim 1, characterized in that the pseudo ranges are measured by the following formulas:

$$\rho_{iS} = \sqrt{(x_i - x_S)^2 + (z_i - z_S)^2}$$

$$\rho_{iL} = \sqrt{(x_i - x_L)^2 + (y_i - y_L)^2 + (z_i - z_L)^2}$$

in which
- i=1, ..., n
- n=the number of satellites (SV1–SV4) used in the positioning,
- $\lfloor x_S, y_S, z_S\rfloor$=the position of the receiver (RX2) of the searcher,
- $\lfloor x_i, y_i, z_1\rfloor$=the position of the satellites at the moment of transmission of the signal used in the calculation of the pseudo ranges,
- $\rho_{i1}$ is pseudo range measured at the searcher,
- $\rho_{i2}$ is pseudo range measured at the object to be searched, and
- $X_L$, $y_L$, and $z_L$ are position coordinates of the receiver (RX1)

wherein, for determining the direction and distance ($\lfloor\Delta x, \Delta y, \Delta z, \Delta t\rfloor$) of the object to be searched from the receiver (RX2) of the searcher, at least the following steps are performed:
- a squaring step for forming the squares of the measured pseudo ranges $$\rho^2_{iS} = (x_i - x_S)^2 + (y_i - y_S)^2 + (z_i - z_S)^2,$$

$$\rho^2_{iL} = (x_i - x_L)^2 + (y_i - y_L)^2 + (z_i - z_L)^2$$

and their difference $\rho^2_{iL} - \rho^2_{iS}$,
- an elimination step for eliminating unknown terms from the formulas formed in the squaring step, and
- a solution step for solving the direction and distance from the formulas processed in the elimination step.

9. A positioning system comprising a receiver (RX1) for an object to be searched, substantially located in the vicinity of the object to be searched; a receiver (RX2) for a searcher, in relation to which the position of the object to be searched is arranged to be determined; and satellites (SV1–SV4) comprising means for transmitting a code-modulated random spectrum signal and means for determining positioning data of the satellites; characterized in that the positioning system also comprises at least:
- means (BS) for determining the default position ($\lfloor\hat{x}_S, \hat{y}_S, \hat{z}_S, \hat{t}_S\rfloor$) of the receiver (RX2) of the searcher,
- means (CH1–CH4, 2) for measuring pseudo ranges ($\rho_{i1}$) between the receiver (RX1) to be searched and at least three satellites (SV1–SV4) on the basis of signals received from the satellites,
- means (CH1–CH4, 2) for measuring pseudo ranges ($\rho_{i2}$) between the receiver (RX2) of the searcher and said at least three satellites (SV1–SV4) on the basis of signals received from the satellites, and
- means (5) for determining the direction and distance ($\lfloor\Delta x, \Delta y, \Delta z, \Delta t\rfloor$) of the object to be searched from the receiver (RX2) of the searcher, wherein said determining means employs the pseudo ranges measured by the object receiver and the pseudo ranges measured by the searcher receiver based on an assumption that there is a common error in measurements performed by the object receiver and by the searcher receiver.

10. The positioning system according to claim 9, characterized in that the direction and distance ($\lfloor\Delta x, \Delta y, \Delta z, \Delta t\rfloor$) of the object to be searched is arranged to be determined in the receiver (RX2) of the searcher, wherein the positioning system also comprises means (9, NW) for transmitting information on the measured pseudo ranges from the receiver (RX1) to be searched to the other receiver (RX2).

11. The positioning system according to claim 9, characterized in that the positioning system also comprises a communication network (9, NW) and means (9, BS) for forming a data transmission link from the receiver (RX1) to be searched and from the receiver (RX2) of the searcher to said communication network, at least for transmitting said information on the pseudo ranges.

12. The positioning system according to claim 9, characterized in that it also comprises:
- means (5) for determining the geometrical distance ($r_i$) between the receiver (RX2) of the searcher and said at least three satellites (SV1–SV4) on the basis of the positioning data and said default position,
- means (5) for correcting ($\epsilon_i$) the pseudo ranges measured in the receiver (RX1) of the object to be searched and in the receiver (RX2) of the searcher on the basis of the determined geometrical distance, and
- means (9, BS) for using the corrected pseudo ranges in determining the direction and distance ($\lfloor\Delta x, \Delta y, \Delta z, \Delta t\rfloor$) of the object to be searched from the receiver (RX2) of the searcher.

13. The positioning system according to claim 9, characterized in that the means (5) for determining the direction and distance ($\lfloor\Delta x, \Delta y, \Delta z, \Delta t\rfloor$) of the object to be searched from the receiver (RX2) of the searcher comprise means (9, BS) for determining the position of the receiver of the object to be searched and means (5) for calculating the difference between the default position of the receiver (RX2) of the searcher and the position of the receiver (RX1) of the object to be searched.

14. The positioning system according to claim 9, characterized in that the direction and distance ($\lfloor\Delta x, \Delta y, \Delta z, \Delta t\rfloor$) of the object to be searched from the receiver (RX2) of the searcher is arranged to be determined by Taylor's method of linearization.

15. The positioning system according to claim 14, characterized in that the direction and distance ($\lfloor\Delta x, \Delta y, \Delta z, \Delta t\rfloor$) of the object to be searched from the receiver (RX2) of the searcher is arranged to be determined by solving the set of equations:

$$\rho_{iL} = \rho_{iS} - \frac{x_i - x_S}{\rho_{iS}}\Delta x - \frac{y_i - y_S}{\rho_{iS}}\Delta y - \frac{z_i - z_S}{\rho_{iS}}\Delta z + c\Delta t, \quad (9)$$

$$i = 1, \ldots, n$$

in which
- n=the number of satellites (SV1–SV4) used for positioning,
- c=the speed of light
- $\lfloor x_S, x_S, z_S \rfloor$=the position of the receiver (RX2) of the searcher,
- $\lfloor x_i, y_i, z_i \rfloor$=the position of satellites at moment of transmission of the signal used in the calculation of the pseudo ranges, and
- Δt=the clock error.

16. The positioning system according to claim 9, characterized in that the pseudo ranges are arranged to be measured by the following formulas:

$$\rho iS = \sqrt{(x_{i-x_S})^2 + (y_{i-y_S})^2 + (z_{...}}$$

$$\rho iL = \sqrt{(x_{i-x_L})^2 + (y_{i-y_L})^2 + (z_{...}}$$

in which
- i=1, . . . , n
- n=the number of satellites (SV1–SV4) used in the positioning,
- $\lfloor x_S, y_S, z_S \rfloor$=the position of the receiver (RX2) of the searcher, and
- $\lfloor x_i, y_i, z_i \rfloor$=the position of the satellites at the moment of transmission of the signal used in the calculation of the pseudo ranges, wherein, for determining the direction and distance ($\lfloor \Delta x, \Delta y, \Delta z, \Delta t \rfloor$) of the object to be searched from the receiver (RX2) of the searcher, at least the following steps are performed:

a squaring step for forming the squares of the measured pseudo ranges $$\rho^2 iS = (x_i - x_S)^2 + (y_i - y_S)^2 + (z_i - z_S)^2,$$

$$\rho^2 iL = (x_i - x_L)^2 + (y_i - y_L)^2 + (z_i - z_L)^2$$

and their difference $\rho^2 iL - \rho^2 iS$, an elimination step for eliminating unknown terms from the formulas formed in the squaring step, and a solution step for solving the direction and distance from the formulas processed in the elimination step.

17. A receiver (RX2) for a searcher, comprising means (CH1–CH4) for receiving code-modulated random spectrum signals transmitted by satellites (SV1–SV4), and means (CH1–CH4, 9) for determining positioning date of satellites, characterized in that the receiver (RX2) also comprises at least:

means (BS) for determining the default position ($\lfloor \hat{x}_S, \hat{y}_S, \hat{z}_S, \hat{t}_S \rfloor$) of the receiver (RX2) of the searcher, means (CH1–CH4,2) for receiving pseudo ranges ($\rho_{i1}$) transmitted by a receiver (RX1) for an object to be searched, located substantially in the vicinity of the object to be searched, measured from the receiver (RX1) to be searched on the basis of signals received from at least three satellites (SV1–SV4), means (CH1–CH4, 2) for measuring pseudo ranges ($\rho_{i2}$) from the receiver (RX2) to said at least three satellites (SV1–SV4) on the basis of signals received from the satellites, and means (5) for determining at least the direction and distance ($\lfloor \Delta x, \Delta y, \Delta z, \Delta t \rfloor$) of the object to be searched from the receiver (RX2) of the searcher, wherein said determining means employs the pseudo ranges measured by the object receiver and the pseudo ranges measured by the searcher receiver based on an assumption that there is a common error in measurements performed by the object receiver and by the searcher receiver.

18. A receiver (RX2) for a searcher, which is arranged to be used in a positioning system comprising a receiver (RX1) for an object to be searched, placed substantially in the vicinity of the object to be searched for, satellites (SV1–SV4) comprising means for transmitting a code-modulated random spectrum signal, and means (CH1–CH4, 9) for determining positioning data of the satellites, and which receiver (RX2) comprises means for receiving the code-modulated random spectrum signals transmitted by the satellites (SV1–SV4), characterized in that the receiver (RX2) of the searcher also comprises at least:

means (CH1–CH4, 2) for measuring pseudo ranges ($\rho_{i2}$) from the receiver (RX2) of the searcher to said at least three satellites (SV1–SV4) on the basis of signals received from the satellites, and means (CH1–CH4, 2) for transmitting said measured pseudo ranges ($\rho_{i2}$) to the positioning system, and means (CH1–CH4, 2) for receiving data on at least the direction and distance ($\lfloor \Delta y, \Delta z, \Delta t \rfloor$) of the object to be searched from the positioning system, wherein the positioning system also comprises:

means (BS) for determining the default position ($\lfloor \hat{x}_S, \hat{y}_S, \hat{z}_S, \hat{t}_S \rfloor$) of the receiver (RX2) of the searcher, means (BS) for receiving the pseudo ranges ($\rho_{i1}$) transmitted by the receiver (RX1) of the object to be searched, placed substantially in the vicinity of the object to be searched, the pseudo ranges ($\rho_{i1}$) being measured between the receiver (RX1) to be searched and at least three satellites (SV1–SV4) on the basis of signals received from the satellites, means (BS) for receiving said pseudo ranges ($\rho_{i2}$) measured in the receiver of the searcher, means (5) for determining at least the direction and distance ($\lfloor \Delta x, \Delta y, \Delta z, \Delta t \rfloor$) of the object to be searched from the receiver (RX2) of the searcher, wherein said determining means employs the pseudo ranges measured by the object receiver and the pseudo ranges measured by the searcher receiver based on an assumption that there is a common error in measurements performed by the object receiver and by the searcher receiver, and means (BS) for transmitting data on at least the direction and distance ($\lfloor \Delta x, \Delta y, \Delta z, \Delta t \rfloor$) of the object to be searched to the receiver (RX2) of the searcher.

19. An electronic device comprising a receiver (RX2) for a searcher, means (CH1–CH4) for receiving code-modulated random spectrum signals transmitted by satellites (SV1–SV4), and means (CH1–CH4, 9) for determining positioning data of the satellites, characterized in that the electronic device also comprises at least:

means (BS) for determining the default position ($\lfloor \hat{x}_S, \hat{y}_S, \hat{z}_S, \hat{t}_S \rfloor$) of the receiver (RX2) of the searcher, means (CH1–CH4, 2) for receiving pseudo ranges ($\rho_{i1}$) transmitted by a receiver (RX1) for an object to be searched, placed substantially in the vicinity of the object to be searched, the pseudo ranges ($\rho_{i1}$) being measured between the receiver (RX1) to be searched and at least three satellites (SV1–SV4) on the basis of signals received from the satellites, means (CH1–CH4, 2) for measuring pseudo ranges ($\rho_{i2}$) between the receiver (RX2) of the searcher and said at least three satellites (SV1–SV4) on the basis of signals received from the satellites, and means (5) for determining at least the direction and distance ($\lfloor\Delta x,\Delta y,\Delta z,\Delta t\rfloor$) between the object to be searched and the receiver (RX2) of the searcher, wherein said determining means employs the pseudo ranges measured by the object receiver and the pseudo ranges measured by the searcher receiver based on an assumption that there is a common error in measurements performed by the object receiver and by the searcher receiver.

20. The electronic device according to claim 19, characterized in that it also comprises means (8, 9, 10, 11, 12a, 12b, 12c) for performing functions of a mobile station.

21. An electronic device which is arranged to be used in a positioning system comprising a receiver (RX1) for an object to be searched, placed substantially in the vicinity of the object to be searched, satellites (SV1–SV4) which comprise means for transmitting a code-modulated random spectrum signal and means (CH1–CH4, 9) for determining positioning data of the satellites, and which electronic device comprises a receiver (RX2) for a searched and means (CH1–CH4) for receiving code-modulated random spectrum signals transmitted by satellites (SV1–SV4), characterized in that the electronic device also comprises at least:

means (CH1–CH4, 2) for measuring pseudo ranges ($\rho_{i2}$) between receiver (RX2) of the searcher and said at least three satellites (SV1–SV4) on the basis of signals received from the satellites, and means (CH1–CH4, 2) for transmitting said measured pseudo ranges ($\rho_{i2}$) to the positioning system, and means (CH1–CH4, 2) for receiving data on at least the direction and distance ($\lfloor\Delta x,\Delta y,\Delta z,\Delta t\rfloor$) of the object to be searched from the positioning system, wherein the positioning system also comprises:

means (BS) for determining the default position ($\lfloor\hat{x}_S,\hat{y}_S,\hat{z}_S,\hat{t}_S\rfloor$) of the receiver (RX2) of the searcher, means (BS) for receiving the pseudo ranges ($\rho_{i1}$) transmitted by the receiver (RX1) of the object to be searched, placed substantially in the vicinity of the object to be searched, the pseudo ranges ($\rho_{i1}$) being measured between the receiver (RX1) of the object to be searched and at least three satellites (SV1–SV4) on the basis of signals received from the satellites, means (BS) for receiving the said pseudo ranges ($\rho_{i2}$) measured in the receiver of the searcher, means (5) for determining at least the direction and distance ($\lfloor\Delta x,\Delta y,\Delta z,\Delta t\rfloor$) of the object to be searched from the receiver (RX2) of the searcher, wherein said determining means employs the pseudo ranges measured by the object receiver and the pseudo ranges measured by the searcher receiver based on an assumption that there is a common error in measurements performed by the object receiver and by the searcher receiver, and means (BS) for transmitting data on at least the direction and distance ($\lfloor\Delta x,\Delta y,\Delta z,\Delta t\rfloor$) of the object to be searched to the receiver (RX2) of the searcher.

22. The electronic device according to claim 21, characterized in that it also comprises means (8, 9, 10, 11, 12a, 12b, 12c) for performing functions of a mobile station.

23. A computing server which is arranged to be used in a positioning system comprising a receiver (RX1) for an object to be searched, placed substantially in the vicinity of the object to be searched, satellites (SV1–SV4) which comprise means for transmitting a code-modulated random spectrum signal and means (CH1–CH4, 9) for determining positioning data of the satellites, and which system further comprises a receiver (RX2) for a searcher and means (CH1–CH4) for receiving code-modulated random spectrum signals transmitted by the satellites (SV1–SV4), characterized in that the server also comprises at least:

means (BS) for receiving pseudo ranges ($\rho_{i1}$) transmitted by the receiver (RX1) of the object to be searched, placed substantially in the vicinity of the object to be searched, the pseudo ranges ($\rho_{i1}$) being measured between the receiver (RX1) of the object to be searched and at at least three satellites (SV1–SV4) on the basis of signals received from the satellites, means (BS) for receiving said pseudo ranges ($\rho_{i2}$) measured in the receiver of the searcher, the pseudo ranges ($\rho_{i2}$) being measured between the receiver (RX1) of the searcher and the at least three satellites (SV1–SV4) on the basis of signals received from the satellites, means (5) for determining at least the direction and distance ($\lfloor\Delta_x,\Delta_y,\Delta_z,\Delta_t\rfloor$) of the object to be searched from the receiver (RX2) of the searcher, and means (BS) for transmitting data on at least the direction and distance ($\lfloor\Delta_x,\Delta_y,\Delta_z,\Delta_t\rfloor$) of the object to be searched to the receiver (RX2) of the searcher, wherein the positioning system also comprises:

means (BS) for determining the default position ($\lfloor\hat{x}_S,\hat{y}_S,\hat{z}_S,\hat{t}_S\rfloor$) of the receiver (RX2) of the searcher, wherein determination by the positioning system are based on an assumption that there is a common error in measurements performed by the object receiver and by the searcher receiver.

* * * * *